US011881339B2

(12) United States Patent
Song et al.

(10) Patent No.: US 11,881,339 B2
(45) Date of Patent: Jan. 23, 2024

(54) COIL COMPONENT

(71) Applicant: SAMSUNG ELECTRO-MECHANICS CO., LTD., Suwon-si (KR)

(72) Inventors: Ji Su Song, Suwon-si (KR); Jea Hoon Lee, Suwon-si (KR); Jong Young Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 288 days.

(21) Appl. No.: 15/931,097

(22) Filed: May 13, 2020

(65) Prior Publication Data

US 2021/0174996 A1 Jun. 10, 2021

(30) Foreign Application Priority Data

Dec. 10, 2019 (KR) ........................ 10-2019-0163947

(51) Int. Cl.
*H01F 17/00* (2006.01)
*H01F 27/06* (2006.01)
*H01F 17/04* (2006.01)

(52) U.S. Cl.
CPC ......... *H01F 17/0013* (2013.01); *H01F 17/04* (2013.01); *H01F 27/06* (2013.01); *H01F 2017/048* (2013.01); *H01F 2027/065* (2013.01)

(58) Field of Classification Search
CPC .......... H01F 17/00; H01F 27/06; H01F 17/04; H01F 17/0013; H01F 2017/048;
(Continued)

(56) References Cited

U.S. PATENT DOCUMENTS 10,854,383 B2 12/2020 Choi
2009/0283306 A1* 11/2009 Nishino ................ G03F 7/0047 174/257
(Continued)

FOREIGN PATENT DOCUMENTS

CN 105957692 A 9/2016
CN 110400671 A 11/2019
(Continued)

OTHER PUBLICATIONS

Korean Office Action dated Oct. 19, 2020 issued in Korean Patent Application No. 10-2019-0163947 (with English translation).
(Continued)

*Primary Examiner* — Danny Nguyen
(74) *Attorney, Agent, or Firm* — Morgan, Lewis & Bockius LLP

(57) ABSTRACT

A coil component includes a body including a first surface and a second surface opposing each other, and a first side surface and a second side surface opposing each other and connecting the first surface of the body to the second surface of the body; a support substrate embedded in the body and including a first surface and a second surface opposing each other; coil portion disposed on the support substrate; and a recognition pattern disposed on the first surface of the body, wherein the recognition pattern extends, from an edge region in which the first surface of the body is in contact with the first side surface of the body, toward an edge region in which the first surface of the body is in contact with the second side surface of the body.

22 Claims, 8 Drawing Sheets

(58) Field of Classification Search
CPC ........... H01F 2017/065; H01F 27/2804; H01F 41/041; H01F 27/32; H01F 27/323; H01F 41/122; H01F 27/29; H01F 27/292
USPC .................................................. 361/117–119
See application file for complete search history.

(56) References Cited

U.S. PATENT DOCUMENTS

| | | | | |
|---|---|---|---|---|
| 2015/0187486 | A1* | 7/2015 | Lim | H01F 27/292 29/602.1 |
| 2016/0268038 | A1 | 9/2016 | Choi | |
| 2017/0018351 | A1* | 1/2017 | Yatabe | H01F 27/2804 |
| 2018/0358169 | A1 | 12/2018 | Nishikawa et al. | |
| 2019/0304663 | A1* | 10/2019 | Shimoichi | H01F 17/0013 |
| 2019/0333687 | A1 | 10/2019 | Yang et al. | |
| 2021/0043371 | A1* | 2/2021 | Shimoda | H01F 27/02 |
| 2021/0134517 | A1* | 5/2021 | Yokoyama | H01F 27/292 |

FOREIGN PATENT DOCUMENTS

| | | | |
|---|---|---|---|
| JP | 2001-319840 | A | 11/2001 |
| JP | 2003-086425 | A | 3/2003 |
| JP | 2005-045103 | A | 2/2005 |
| JP | 2005-166745 | A | 6/2005 |
| JP | 2006-108383 | A | 4/2006 |
| JP | 2018-207028 | A | 12/2018 |
| KR | 10-2015-0089278 | A | 8/2015 |
| KR | 10-2016-0108935 | A | 9/2016 |
| KR | 10-2016-0133184 | A | 11/2016 |

OTHER PUBLICATIONS

Chinese Office Action dated Jun. 29, 2022, issued in corresponding Chinese Patent Application No. 202010708837.7 (with English translation).

Chinese Office Action dated Mar. 31, 2023, issued in corresponding Chinese Patent Application No. 202010708837.7.

* cited by examiner

COIL COMPONENT

CROSS-REFERENCE TO RELATED APPLICATION(S)

The present application claims the benefit of priority to Korean Patent Application No. 10-2019-0163947 filed on Dec. 10, 2019 in the Korean Intellectual Property Office, the disclosure of which is incorporated herein by reference in its entirety.

TECHNICAL FIELD

The present disclosure relates to a coil component.

BACKGROUND

An inductor, a coil component, is a typical passive electronic component used in electronic devices, along with a resistor and a capacitor.

In general, a recognition pattern may be formed on a coil portion for the purpose of identifying a direction to be mounted on a printed circuit board or the like.

Meanwhile, when the coil component is inclined to and mounted on the printed circuit board, possibility of cracking due to external force in the body may increase. As the coil component is miniaturized, it is also increasingly necessary to easily recognize whether such inclination is present.

SUMMARY

An aspect of the present disclosure is to provide a coil component capable of not only identifying a direction to be mounted on a printed circuit board or the like, but also easily recognizing whether inclination is present, when mounted on the printed circuit board.

According to an aspect of the present disclosure, a coil component includes a body including a first surface and a second surface opposing each other, and a first side surface and a second side surface opposing each other and connecting the first surface of the body to the second surface of the body; a support substrate embedded in the body and including a first surface and a second surface opposing each other; a first coil portion and a second coil portion, respectively disposed on the first surface of the support substrate and the second surface of the support substrate to oppose each other with respect to the support substrate; and a recognition pattern disposed on the first surface of the body, wherein the recognition pattern extends from an edge region in which the first surface of the body is in contact with the first side surface of the body, toward an edge region in which the first surface of the body is in contact with the second side surface of the body.

According to an aspect of the present disclosure, a coil component includes a body including a first surface and a second surface opposing each other, a third surface and a fourth surface opposing each other and connecting the first surface to the second surface, and a fifth surface and a sixth surface opposing each other and connecting the first surface to the second surface; a support substrate embedded in the body and including a first surface and a second surface opposing each other; a first coil portion and a second coil portion, respectively disposed on the first surface of the support substrate and the second surface of the support substrate to oppose each other; and a plurality of recognition patterns disposed on the first surface of the body and spaced apart from one another. At least one recognition pattern, among the plurality of recognition patterns, extends from an edge region in which the first surface of the body is in contact with the third surface of the body, toward an edge region in which the first surface of the body is in contact with the fourth surface of the body. The plurality of recognition patterns are spaced apart from the fifth surface of the body by a constant distance.

According to an aspect of the present disclosure, a coil component includes a body including a first surface and a second surface opposing each other, and a first side surface and a second side surface opposing each other and connecting the first surface of the body to the second surface of the body; a support substrate embedded in the body and including a first surface and a second surface opposing each other; a first coil portion and a second coil portion, respectively disposed on the first surface of the support substrate and the second surface of the support substrate to oppose each other with respect to the support substrate; and a recognition pattern disposed on the first surface of the body, wherein the recognition pattern extends from a first edge, defined by the first surface and the first side surface of the body, in a direction substantially perpendicular to the first edge.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
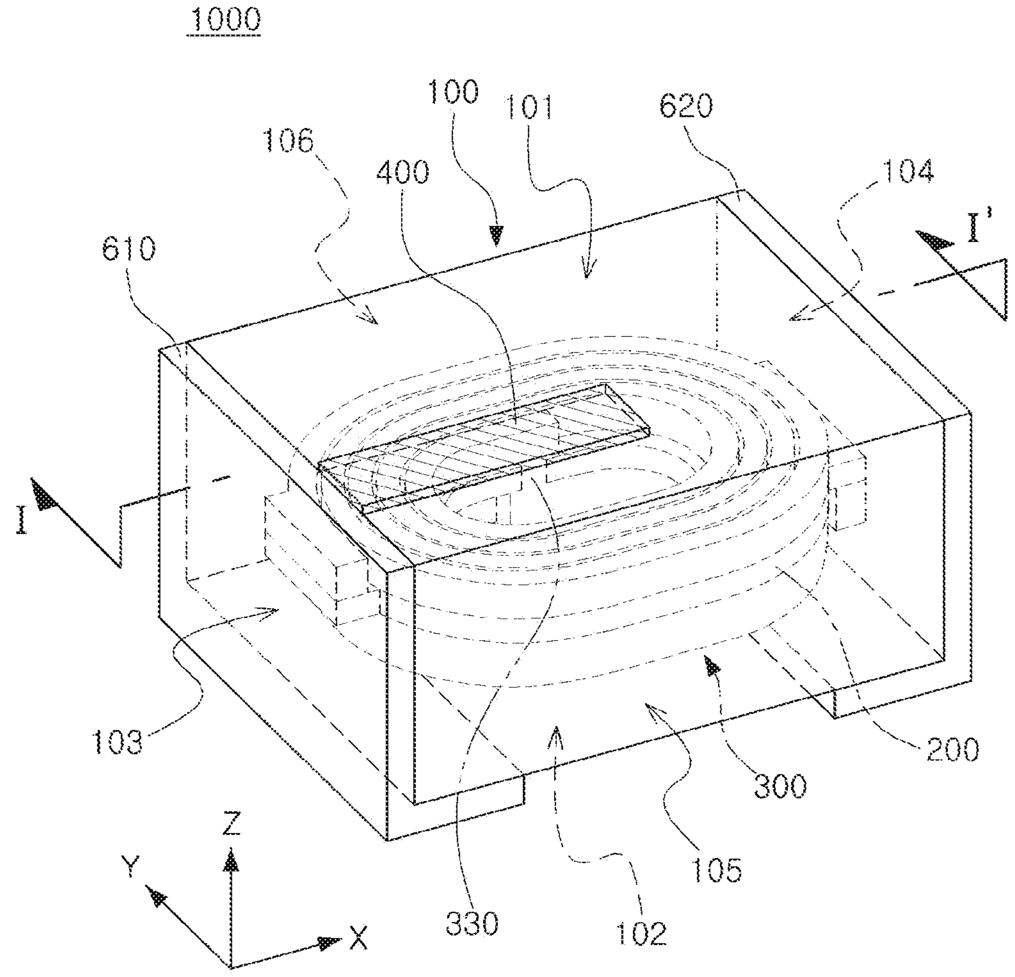
FIG. 1 is a view schematically illustrating a coil component according to a first exemplary embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a gravity direction.

The term "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an X direction is a first direction or a length direction, a Y direction is a second direction or a width direction, a Z direction is a third direction or a thickness direction.

A value used to describe a parameter such as a 1-D dimension of an element including, but not limited to, "length," "width," "thickness," "diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

As described later, when the recognition pattern 400 includes an organic material, the detector may recognize the organic material included in the recognition pattern and the metal magnetic material included in the body to be distinguished from each other. That is, the detector of this embodiment means a high-precision camera capable of recognizing differences of contrast between organic material and metal magnetic material.

As described later, as a result, 'd1', 'd2', 'W', 'L1', and 'L2' can be measured by distinguishing the boundary surfaces between the organic material and the metal magnetic material through the high-precision camera. for example, the 'd1', 'd2', 'W', 'L1', and 'L2' are calculated by measuring each of the maximum and minimum values of the 'd1', 'd2', 'W', 'L1', and 'L2' and except the median of these values.

Hereinafter, a coil component according to exemplary embodiments of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component maybe used as a power inductor, a high frequency (HF) inductor, a general bead, a high frequency (GHz) bead, a common mode filter, and the like.

Hereinafter, a coil component 1000 according to an exemplary embodiment of the present disclosure will be described on the basis that the coil component 1000 is a thin film inductor used in a power line of a power supply circuit. However, the coil component according to an exemplary embodiment of the present disclosure may be appropriately applied as a chip bead, a chip filter, etc. in addition to the thin film inductor.

First Exemplary Embodiment

Figure 2:
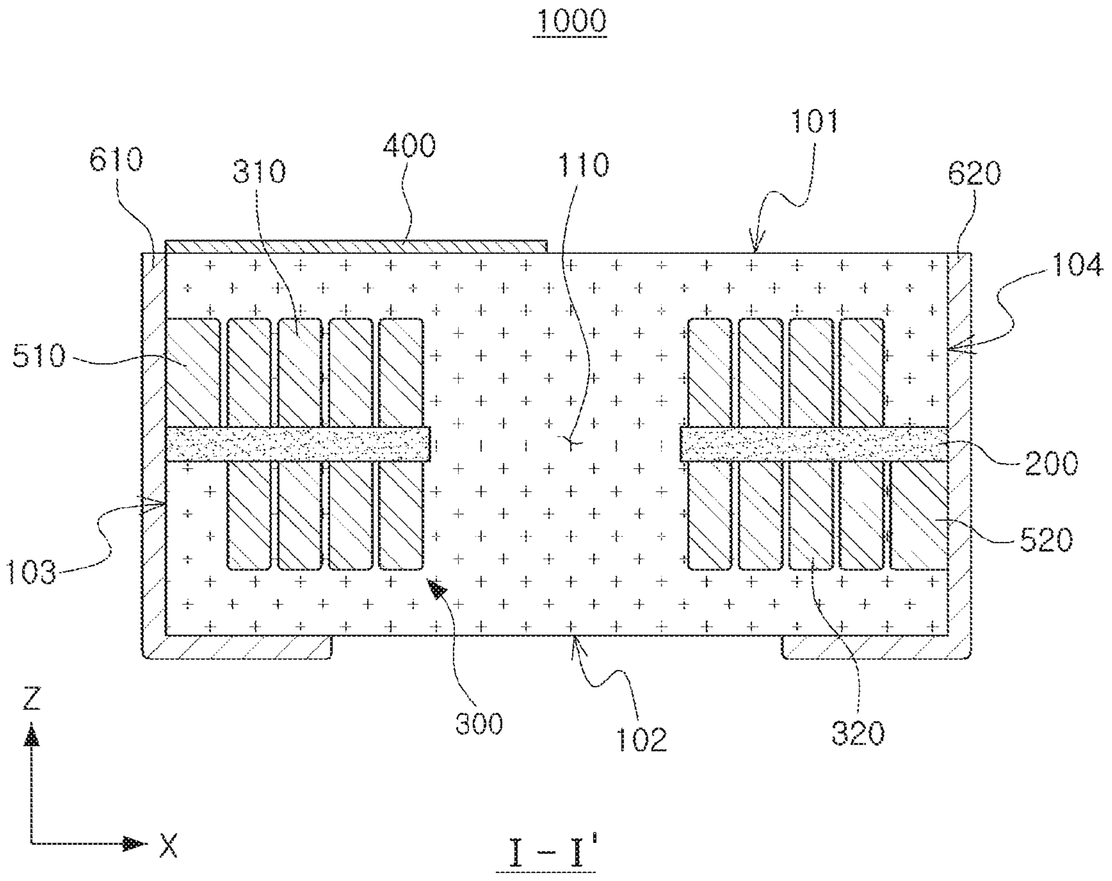
FIG. 2 is a cross-sectional view taken along line I-I' of FIG. 1.
Figure 3:
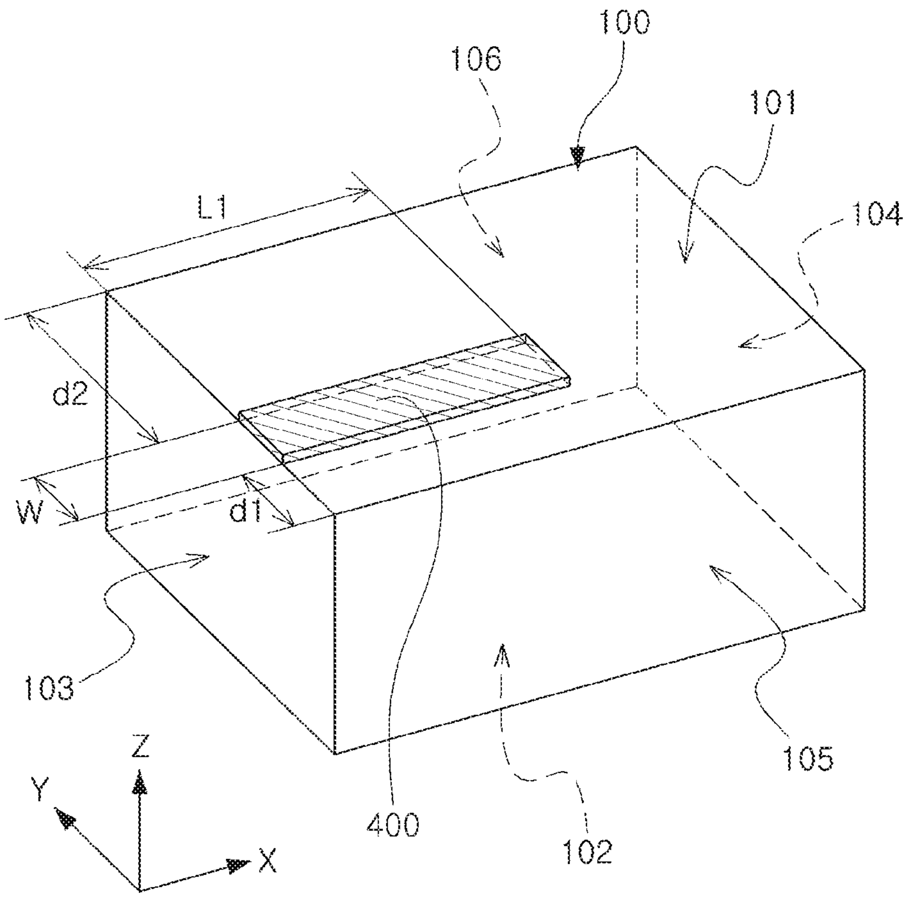
FIG. 3 is a view schematically illustrating the body of the coil component of FIG. 1.
Figure 4A:
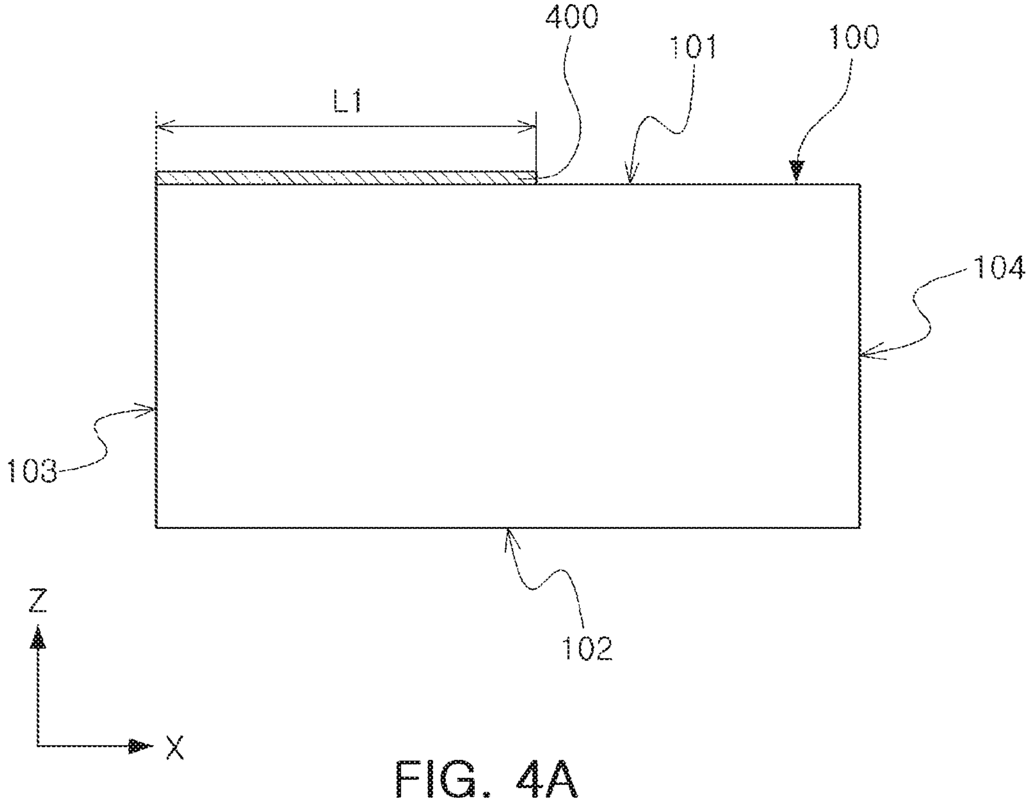
FIG. 4A is a perspective view illustrating the body of the coil component of FIG. 3, viewed from a fifth surface of the body.
Figure 4B:
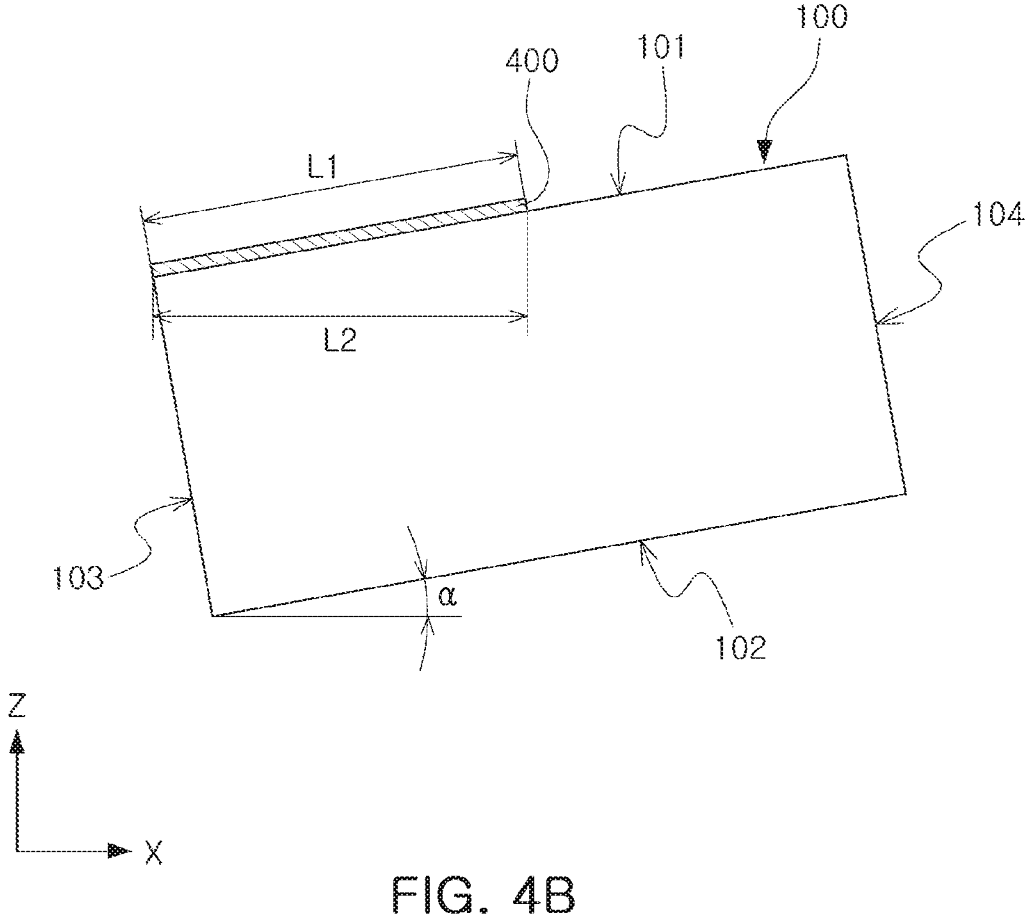
FIG. 4B is a view illustrating the body of FIG. 3, viewed from a fifth surface of the body, when the coil component of FIG. 1 is inclined to and mounted on the printed circuit board.

FIG. 1 is a view schematically illustrating a coil component according to a first exemplary embodiment of the present disclosure. FIG. 2 is a cross-sectional view taken along line I-I' of FIG. 1. FIG. 3 is a view schematically illustrating the body of the coil component of FIG. 1. FIG. 4A is a perspective view illustrating the body of the coil component of FIG. 3, viewed from a fifth surface of the body. FIG. 4B is a view illustrating the body of FIG. 3, viewed from a fifth surface of the body, when the coil component of FIG. 1 is inclined to and mounted on the printed circuit board.

Referring to FIGS. 1 to 4, a coil component 1000 according to this embodiment may include a body 100, a support substrate 200, first and second coil portions 310 and 320, a recognition pattern 400, first and second lead-out portions 510 and 520, and first and second external electrodes 610 and 620.

The body 100 may form an exterior of the coil component 1000 according to this embodiment, and the support substrate 200 may be disposed therein.

The body 100 may be formed to have a hexahedral shape overall.

Referring to FIG. 1, the body 100 may include a first surface 101 and a second surface 102 opposing each other in a thickness direction Z, a third surface 103 and a fourth surface 104 opposing each other in a length direction X, and a fifth surface 105 and a sixth surface 106 opposing each other in a width direction Y. The third surface 103 and the fourth surface 104 of the body 100 oppose each other while connecting the first surface 101 to the second surface 102 of the body 100. The fifth surface 105 and the sixth surface 106 of the body 100 oppose each other while connecting the first surface 101 to the second surface 102 of the body 100. In this embodiment, one surface and the other surface of the body 100 may refer to the first surface 101 and the second surface 102, respectively, one side surface and the other side surface of the body 100 may refer to the third surface 103 and the fourth surface 104, respectively, and one end surface and the other end surface of the body 100 may refer to the fifth surface 105 and the sixth surface 106, respectively.

The body 100 may be formed such that the coil component 1000 according to this embodiment in which the external electrodes 610 and 620 to be described later are formed has a length of 2.5 mm, a width of 2.0 mm, and a thickness of 1.2 mm, a length of 2.0 mm, a width of 1.6 mm, and a thickness of 1.0 mm, a length of 2.0 mm, a width of 1.2 mm, and a thickness of 0.8 mm, or a length of 1.6 mm, a width of 0.8 mm, and a thickness of 0.8 mm, but is not limited thereto. Since the above-described numerical values do not take into account errors in the process, cases in which values are different from the above-mentioned values due to the errors in the process belong to the scope of the present disclosure.

The body 100 may include a magnetic material and an insulating resin. Specifically, the body 100 may be formed by stacking one or more magnetic sheets including the insulating resin and the magnetic material dispersed in the insulating resin, and then curing the magnetic composite sheet. The body 100 may have a structure other than the structure in which the magnetic material may be dispersed in the insulating resin. For example, the body 100 may be made of a magnetic material such as ferrite.

The magnetic material may be, for example, a ferrite powder particle or a metal magnetic material.

Examples of the ferrite powder particle may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, or Li-based ferrites.

The metal magnetic material may include one or more selected from the group consisting of iron (Fe), silicon (Si), chromium (Cr), cobalt (Co), molybdenum (Mo), aluminum (Al), niobium (Nb), copper (Cu), nickel (Ni), and alloys thereof. For example, the metal magnetic material may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metallic magnetic material may be amorphous or crystalline. For example, the metal magnetic material may be a Fe—Si—B—Cr-based amorphous alloy powder, but is not limited thereto.

The ferrite powder particle and the metal magnetic material may have an average diameter of about 0.1 μm to 30 μm, respectively, but are not limited thereto.

The body 100 may include two or more types of magnetic materials dispersed in an insulating resin. In this case, the term "different types of magnetic materials" means that the magnetic materials dispersed in the insulating resin are distinguished from each other by diameter, composition, crystallinity, and a shape.

The insulating resin may include an epoxy, a polyimide, a liquid crystal polymer, or the like, in a single form or in combined forms, but is not limited thereto.

The body 100 may include the first and second coil portions 310 and 320, and a core 110 passing through the support substrate 200 to be described later. The core 110 may be formed by filling the magnetic composite sheet with through-holes of a coil portion 300 in operations of stacking and curing the magnetic composite sheet, but is not limited thereto.

The support substrate 200 may be embedded in the body 100, and may include a first surface and a second surface opposing each other.

The support substrate 200 may be formed of an insulating material including a thermosetting insulating resin such as an epoxy resin, a thermoplastic insulating resin such as polyimide, or a photosensitive insulating resin, or may be formed of an insulating material in which a reinforcing material such as a glass fiber or an inorganic filler is impregnated with such an insulating resin. For example, the support substrate 200 may be formed of an insulating material such as prepreg, Ajinomoto Build-up Film (ABF), FR-4, a bismaleimide triazine (BT) film, a photoimageable dielectric (PID) film, and the like, but is not limited thereto.

As the inorganic filler, at least one or more selected from a group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the support substrate 200 is formed of an insulating material including a reinforcing material, the support substrate 200 may provide better rigidity. When the support substrate 200 is formed of an insulating material not containing glass fibers, the support substrate 200 may be advantageous for reducing a thickness of the overall coil portions 310 and 320.

The first and second coil portions 310 and 320 may be respectively disposed on the first surface and the second surface of the support substrate 200 to oppose each other with respect to the support substrate 200, and may express characteristics of the coil component. For example, when the coil component 1000 of this embodiment is used as a power inductor, the first and second coil portions 310 and 320 may function to stabilize the power supply of an electronic device by storing an electric field as a magnetic field and maintaining an output voltage.

The coil portions 310 and 320 applied to this embodiment may include a first coil portion 310, a second coil portion 320, and a via 330.

The second coil portion 320, the support substrate 200, and the first coil portion 310 may be sequentially arranged in a stacked form in the thickness direction Z of the body 100.

Each of the first coil portion 310 and the second coil portion 320 may be formed to have a planar spiral shape. For example, the first coil portion 310 may form at least one turn about an axis of the core 110 of the body 100 on the first surface of the support substrate 200 (an upper surface of the support substrate, based on FIG. 2). The second coil portion 320 may form at least one turn about the axis of the core 110 of the body 100 on the second surface of the support substrate 200 (a lower surface of the support substrate, based on FIG. 2). The first and second coil portions 310 and 320 may be coiled in the same direction.

The via 330 may pass through the support substrate 200 to electrically connect the first coil portion 310 and the second coil portion 320, to contact the first coil portion 310 and the second coil portion 320, respectively. As a result, the coil portion 300 applied to this embodiment may be formed in the body 100, as a single coil generating a magnetic field, in the thickness direction Z of the body 100.

At least one of the first coil portion 310, the second coil portion 320, and the via 330 may include at least one conductive layer.

For example, when the second coil portion 320 and the via 330 are formed by a plating process, the second coil portion 320 and the via 330 may include a seed layer and an electroplating layer, respectively. The seed layer may be formed by an electroless plating process or by a vapor deposition process such as a sputtering process. The electroplating layer may have a single layer structure or a multilayer structure. The electroplating layer of the multilayer structure may be formed in a conformal film structure in which one electroplating layer may be covered by the other electroplating layer, and may be only formed in a structure in which the other electroplating layer is stacked on one surface of anyone electroplating layer. The seed layer of the second coil portion 320 and the seed layer of the via 330 may be integrally formed so as not to form a boundary therebetween, but are not limited thereto. The electroplating layer of the second coil portion 320 and the electroplating layer of the via 330 may be integrally formed so as not to form a boundary therebetween, but are not limited thereto.

Each of the first coil portion 310 and the second coil portion 320 may have a planar spiral in which at least one turn is formed around the core portion 110. For example, the first coil portion 310 may format least one turn about the core portion 110 on the one surface of the support substrate 200.

Each of the first coil portion 310, the second coil portion 320, and the via 330 may be formed of a conductive material such as copper (Cu), aluminum (Al), silver (Ag), tin (Sn), gold (Au), nickel (Ni), lead (Pb), titanium (Ti), chromium (Cr), or alloys thereof, but is not limited thereto.

The first and second lead-out portions 510 and 520 may be exposed from the third surface 103 and the fourth surface 104 of the body 100, respectively. In detail, the first lead-out portion 510 may be exposed from the third surface 103, which maybe one side surface of the body 100, and the second lead-out portion 520 may be exposed from the fourth surface 104, which may be the other side surface of the body 100.

Referring to FIG. 2, the one surface of the support substrate 200 may be connected to an end portion of the first coil portion 310 to form the first lead-out portion 510, and the other surface of the support substrate 200 maybe connected to an end portion of the second coil portion 320 to form the second lead-out portion 520. In addition, the first and second external electrodes 610 and 620 and the first and second coil portions 310 and 320 may be respectively connected to each other by the first and second lead-out portions 510 and 520 disposed in the body 100.

The first and second lead-out portions 510 and 520 may include a conductive metal such as copper (Cu). When the first and second coil portions 310 and 320 are formed by a plating process, the first and second lead-out portions 510 and 520 may be formed together with the first and second coil portions 310 and 320.

The recognition pattern 400 may be disposed on the first surface 101, which may be the one surface of the body 100. Referring to FIG. 3, the recognition pattern 400 may extend from an edge region in which the first surface 101 of the body 100 and the third surface 103 of the body 100 are in contact with each other, toward an edge region in which the first surface 101 of the body 100 and the fourth surface 104 of the body 100 are in contact with each other. In addition, the recognition pattern 400 may be spaced apart from the fifth surface 105 of the body 100 in a constant distance. Referring to FIG. 3, a distance (d1) between the fifth surface 105 of the body 100 and the recognition pattern 400 and a distance (d2) between the sixth surface 106 of the body 100 and the recognition pattern 400 may be respectively maintained in a constant distance. For example, since the recognition pattern 400 has a straight linear shape, the distance (dl) between the fifth surface 105 and the recognition pattern 400 may be kept constant. Although not specifically illustrated, the recognition pattern 400 may be extended to an edge region in which the first surface 101 of the body 100 and the fourth surface 104 of the body 100 are in contact with each other. For example, when the coil component 1000 is formed to have a length of 1.6 mm, a width of 0.8 mm, and a thickness of 0.8 mm or less (1608 size), the recognition pattern 400 may range from the edge region in which the first surface 101 of the body 100 and the third surface 103 of the body 100 are in contact with each other, to the edge region in which the first surface 101 of the body 100 and the fourth surface 104 of the body 100 are in contact with each other (e.g., the recognition pattern 400 may extend on the entire length of the first surface 101 in the length direction X). In one exemplary embodiment, the recognition pattern 400 may extend from a first edge, defined by the first surface 101 and the third surface 103 of the body 100, in a direction substantially perpendicular to the first edge. In other words, the recognition pattern 400 may extend in a direction substantially parallel to a side edge of the first surface 101 connecting the first edge to a second edge in opposite to the first edge on the first surface 101.

Referring to FIG. 3, a length (L1) of the recognition pattern 400 may be 1.0 mm or more and 1.6 mm or less. When the length (L1) of the recognition pattern 400 is less than 1.0 mm, recognition itself by a detector (e.g., a camera) to be described later may not be smoothly performed. When the length (L1) of the recognition pattern 400 is more than 1.6 mm, it may be difficult to measure whether eccentricity to be described later in the coil component 1000 of 1608 size. A line width (W) of the recognition pattern 400 may be 2.0 mm or more and 4.0 mm or less. When the line width (W) of the recognition pattern 400 is less than 2.0 mm, the recognition itself by the detector to be described later may not be smoothly performed. When the line width (W) of the recognition pattern 400 is more than 4.0 mm, it may be difficult to measure whether eccentricity in the coil component 1000 of 1608 size. The numerical range of the length (L1) and the line width (W), described above, may be a standard range in which the coil components 1000 of 2520 size to 1608 size series may recognize the recognition patterns 400 in the same positions, regardless of the size of the components. Therefore, the recognition pattern 400 should have a length and a line width that the detector can recognize, and should be measurable in the coil component 1000 of 1608 size.

All dimensions described in the specification and indicated in the drawings may be measured by a standard method that will be apparent to and understood by one of ordinary skill in the art.

The recognition pattern 400 may include an insulating material. Generally, the recognition pattern 400 formed in an electronic component may be formed by printing an insulating paste containing a non-magnetic substance on an outer surface of an electronic component. The insulating paste may include an insulating resin and a non-magnetic filler. Therefore, an interface may be formed between the recognition pattern 400 and the body 100 including the magnetic material. The recognition pattern 400 has a structure such that the insulating paste is additionally disposed on an outer surface of the body 100. As a result, referring to FIGS. 1 to 4, the recognition pattern 400 may be formed to protrude from the first surface 101 of the body 100 to have a predetermined thickness.

When the coil component is mounted on a printed circuit board, the body 100 may be inclined with respect to a mounting surface. As the external electrodes 610 and 620 described later are formed on a lower surface 102 of the body 100, the mounting surface with the printed circuit board may be formed on the lower surface 102 of the body 100. When the lower surface 102 and the mounting surface of the body 100 are inclined to each other, there may be a problem in that the coil component 1000 and the printed circuit board are mounted in a twisted state. As a result, there may be a high possibility that a crack failure due to external force is generated in an edge portion of the body 100 adjacent to the mounting surface. Therefore, it maybe necessary to easily detect whether such failure occurs, through the recognition pattern 400 formed on an upper surface 101 of the body 100 parallel to the mounting surface. FIG. 4A illustrates a case in which the coil component 1000 illustrated in FIG. 1 is normally mounted on a printed circuit board, and FIG. 4B illustrates a case in which the second surface 102 of the body 100 illustrated in FIG. 4A is eccentrically mounted on the mounting surface to have a slope angle (α) therebetween. When eccentrically mounted, the length (L1) of the recognition pattern 400 formed on the first surface 101 of the body 100 may be not changed, but a length (L2) of the recognition pattern 400 to be recognized by the detector disposed outside the coil component 1000 may decrease. For example, since the detector will detect the recognition pattern 400 in the normal state, when the coil component 1000 is eccentrically mounted, only the length (L2) disposed in a direction, parallel to the mounting surface of the recognition pattern 400, may be recognized. Therefore, a difference in length (L1-L2) of the recognition pattern 400 recognized by the detector may be measured to be easily recognized whether eccentric mounting occurs.

Table 1 and Table 2 are tables comparing a difference in length (L1-L2) of the recognition pattern 400 recognized by the detector according to the slope angle, when eccentric mounting occurs. As illustrated, when eccentric mounting occurs in 20 degrees, it can be seen that the difference in length (L1-L2) of the recognition pattern 400 recognized by the detector increases. Meanwhile, the ratio of the difference in length (L1-L2) of recognition pattern 400 recognized by detector (unit: %) is measured the same regardless of the length of the recognition pattern itself. As a result, when referring Table 1 and Table 2, it is possible to measure the eccentricity described above in both the case where the length of the recognition pattern is 1.0 mm and in the case of 1.6 mm.

TABLE 1

| Eccentric Mounting (°) | Length (L1) of Recognition Pattern formed on 1st surface of Body (unit: mm) | Length (L2) at which Detector recognizes Recognition Pattern (unit: mm) | Difference in Length (L1 − L2) of Recognition Pattern 400 recognized by Detector (unit: %) |
|---|---|---|---|
| 5° | 1.6 | 1.59392 | 0.38 |
| 10° | 1.6 | 1.57568 | 1.52 |
| 15° | 1.6 | 1.545472 | 3.408 |
| 20° | 1.6 | 1.503488 | 6.032 |

TABLE 2

| Eccentric Mounting (°) | Length (L1) of Recognition Pattern formed on 1st surface of Body (unit: mm) | Length (L2) at which Detector recognizes Recognition Pattern (unit: mm) | Difference in Length (L1 − L2) of Recognition Pattern 400 recognized by Detector (unit: %) |
|---|---|---|---|
| 5° | 1.0 | 0.9962 | 0.38 |
| 10° | 1.0 | 0.9848 | 1.52 |
| 15° | 1.0 | 0.96592 | 3.408 |
| 20° | 1.0 | 0.93968 | 6.032 |

For example, since the body 100 may be inclined and mounted as the difference in length (L1-L2) of the recognition pattern 400 recognized by the detector increases, it may be detected whether the crack failure of the coil component 1000 occurs.

Although not illustrated in detail, an insulating film (not illustrated) may be disposed between the recognition pattern 400 and the body 100 to insulate the recognition pattern 400 from the magnetic material of the body 100.

The insulating film (not illustrated) may cover the first and second coil portions 310 and 320 such that the magnetic material forming the body 100 and the first and second coil portions 310 and 320 are not directly in contact with each other. The insulating film (not illustrated) maybe formed by coating an insulating material such as parylene by a chemical vapor deposition (CVD) process, but the present disclosure is not limited thereto. In addition, the insulating film (not illustrated) may be formed by a well-known process, such as a screen printing process, an exposure process using a photoresist (PR), a process using image development, a spray coating process, or the like.

The first and second external electrodes 610 and 620 may cover the first and second lead-out portions 510 and 520, respectively, and may be disposed on at least portion of the other surface 102 of the body 100. The first and second external electrodes 610 and 620 may be formed by a vapor deposition process such as a sputtering process, a plating process, or a paste printing process. The first and second external electrodes 610 and 620 may be formed of a conductive material such as copper (Cu), aluminum (Al), silver (Ag), tin (Sn), gold (Au), nickel (Ni), lead (Pb), titanium (Ti), or alloys thereof, but are not limited thereto. The first and second external electrodes 610 and 620 may each have a single layer structure or a structure including a plurality of layers. In the latter case, each of the first and second external electrodes 610 and 620 may include a conductive resin layer containing conductive powder and a resin, a nickel plating layer containing nickel (Ni), and a tin plating layer including tin (Sn), but is not limited thereto.

The first and second external electrodes 610 and 620 may electrically connect the coil component 1000 to the printed circuit board or the like, when the coil component 1000 according to this embodiment is mounted on the printed circuit board. For example, the coil component 1000 according to this embodiment may be mounted, after the second surface 102 of the body 100 is disposed to face the printed circuit board. The coil component 1000 according to this embodiment may be easily connected to the printed circuit board or the like, due to a region disposed on the second surface 102 of the body 100, among regions of the first and second external electrodes 610 and 620.

Although FIGS. 1 and 2 illustrate that the first and second external electrodes 610 and 620 applied to this embodiment are each L-shaped, these are merely illustrative. For example, in a different manner to those illustrated in FIGS. 1 and 2, the first and second external electrodes 610 and 620 may be configured to have five-surface or three-surface electrode, respectively, or may be configured to be spaced apart from each other only on the second surface 102 of the body 100.

Second Exemplary Embodiment

Figure 5:
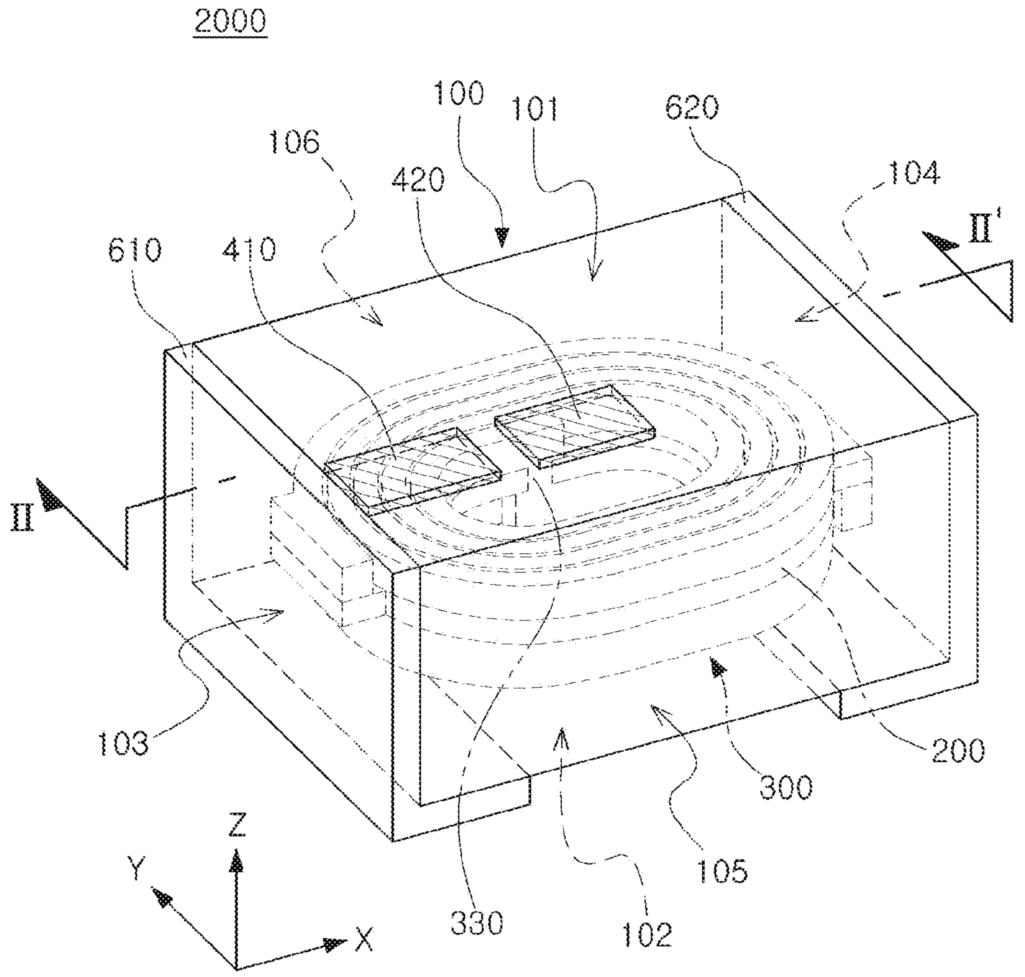
FIG. 5 is a view schematically illustrating a coil component according to a second exemplary embodiment of the present disclosure.
Figure 6:
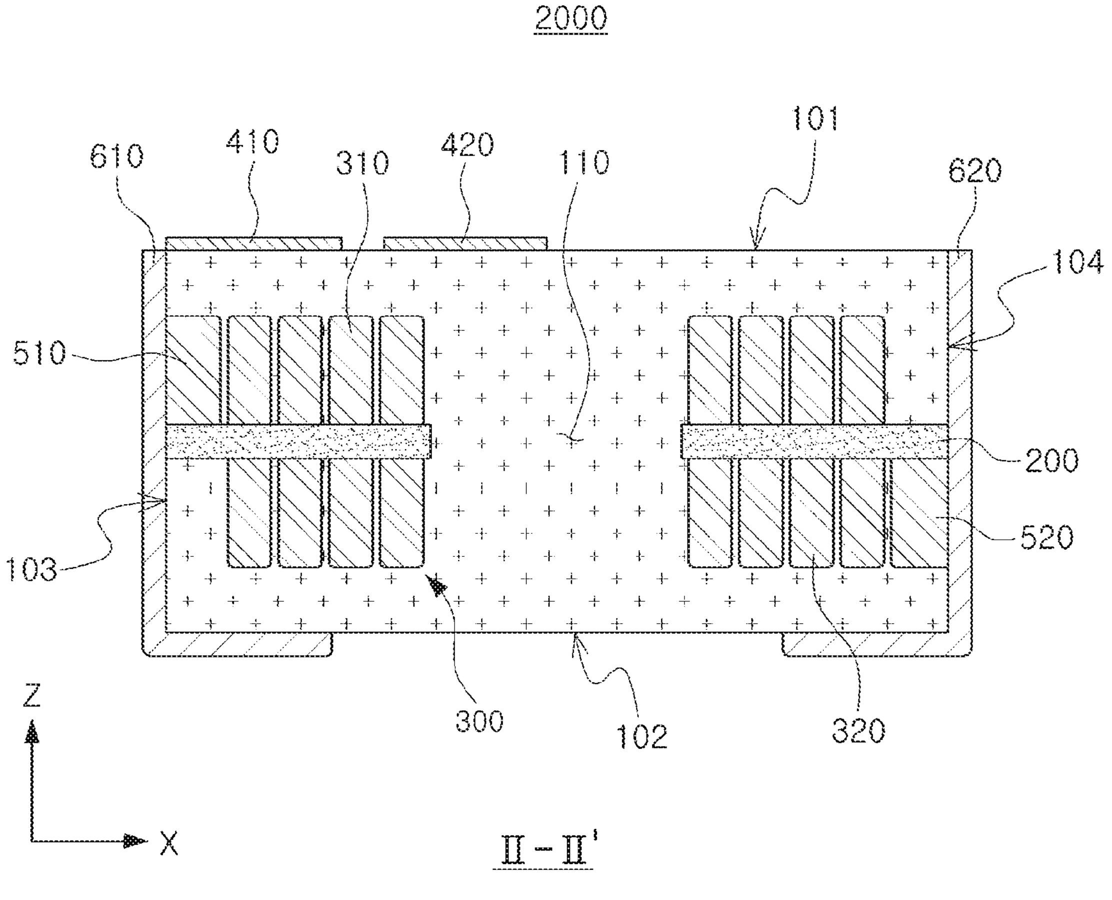
FIG. 6 is a cross-sectional view taken along line II-II' of FIG. 5.
Figure 7:
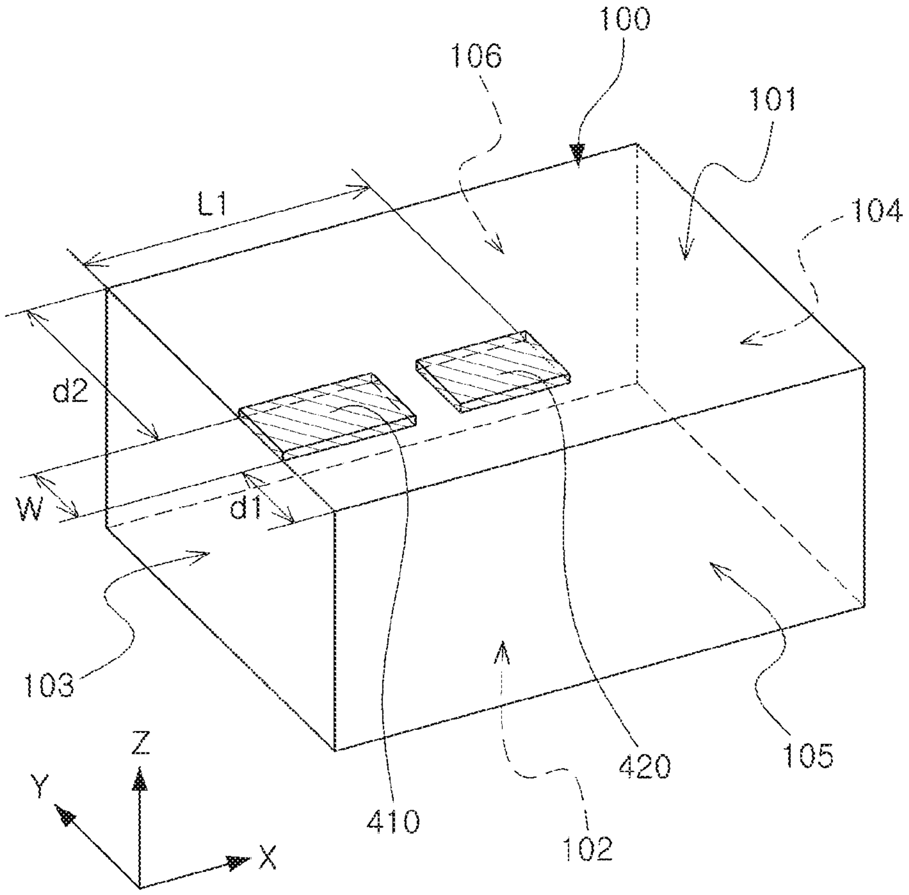
FIG. 7 is a view schematically illustrating the body of the coil component of FIG. 5.
Figure 8A:
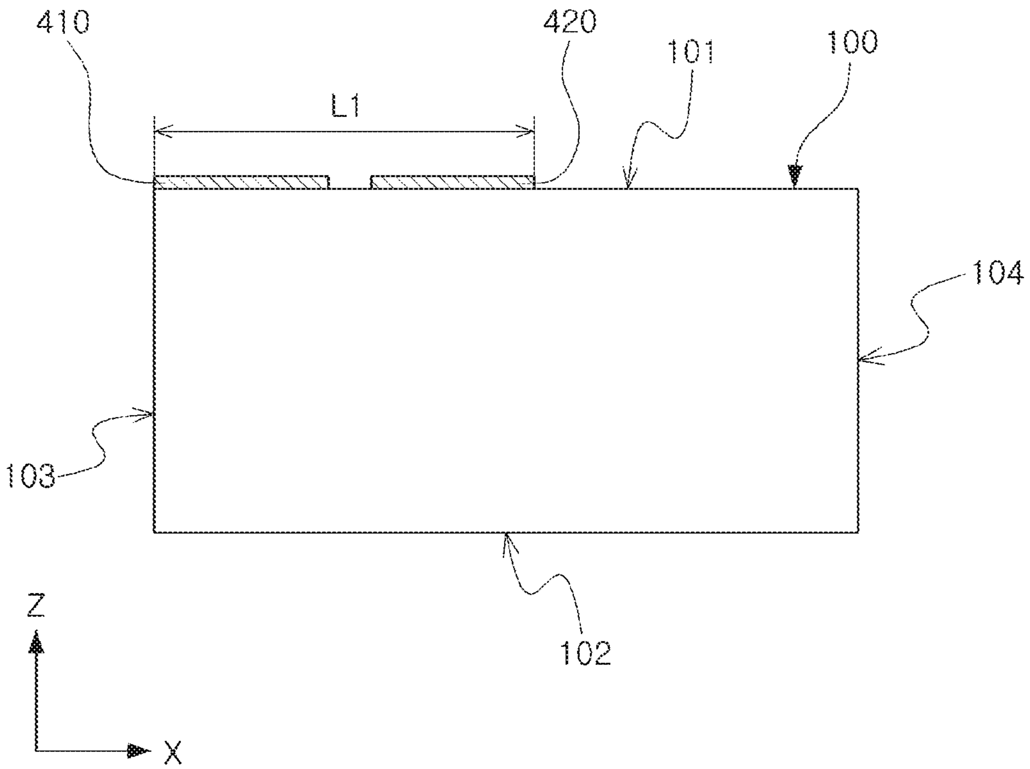
FIG. 8A is a perspective view illustrating the body of the coil component of FIG. 7, viewed from a fifth surface of the body.
Figure 8B:
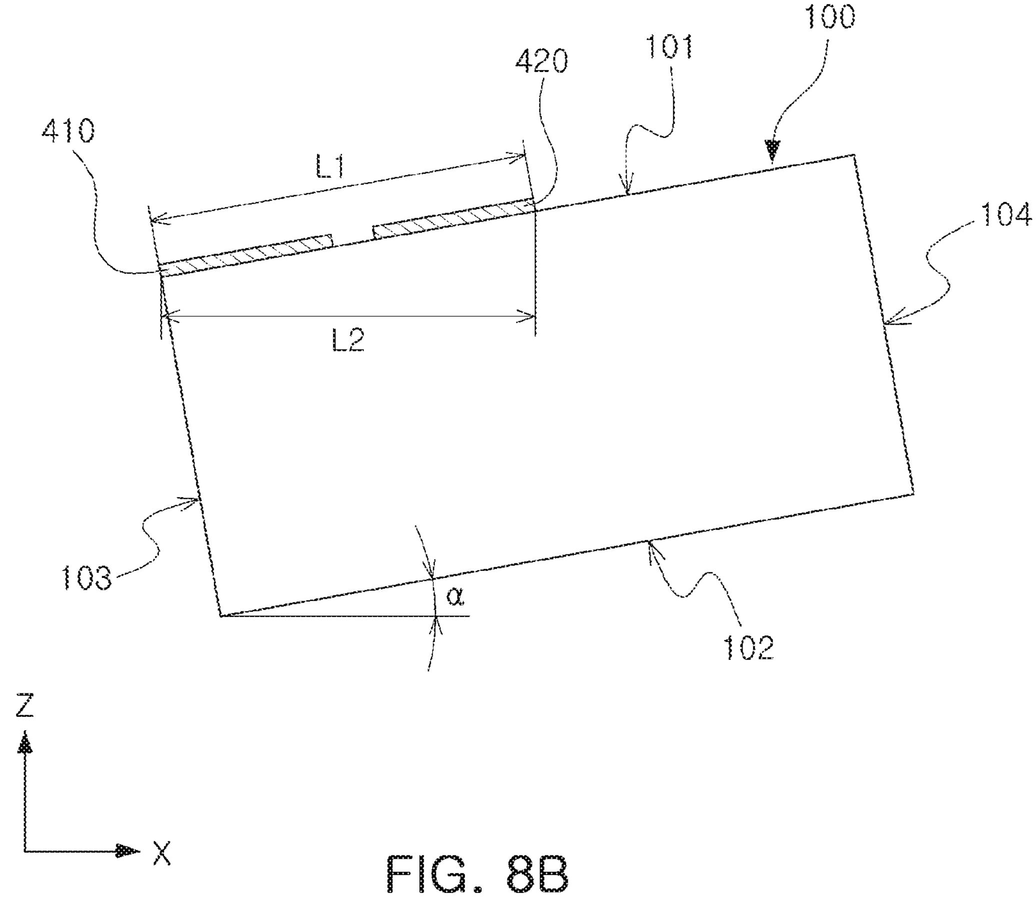
FIG. 8B is a view illustrating the body of FIG. 7, viewed from a fifth surface of the body, when the coil component of FIG. 5 is inclined to and mounted on the printed circuit board.

FIG. 5 is a view schematically illustrating a coil component according to a second exemplary embodiment of the present disclosure. FIG. 6 is a cross-sectional view taken along line II-II' of FIG. 5. FIG. 7 is a view schematically illustrating the body of the coil component of FIG. 5. FIG. 8A is a perspective view illustrating the body of the coil component of FIG. 7, viewed from a fifth surface of the body. FIG. 8B is a view illustrating the body of FIG. 7, viewed from a fifth surface of the body, when the coil component of FIG. 5 is inclined to and mounted on the printed circuit board.

Referring to FIGS. 5 and 6, a plurality of recognition patterns 410 and 420 may be spaced apart from each other on a first surface 101 of a body 100, compared to the coil component 1000 according to the first exemplary embodiment of the present disclosure. Therefore, only the plurality of recognition patterns 410 and 420 different from the first exemplary embodiment will be described in describing this embodiment. The remaining configuration of this embodiment may be applied as it is in the first exemplary embodiment of the present disclosure.

A coil component 2000 according to this embodiment may include the plurality of recognition patterns 410 and 420 formed on the first surface 101 of the body 100 to be spaced apart from each other. Referring to FIG. 7, at least one of the plurality of recognition patterns 410 and 420 may extend from an edge region in which the first surface 101 of the body 100 and a third surface 103 of the body 100 are in contact with each other, toward an edge region in which the first surface 101 of the body 100 and a fourth surface 104 of the body 100 are in contact with each other. Since each of the plurality of recognition patterns 410 and 420 may have a straight linear shape, a distance (d1) between the fifth surface 105 of the body 100 and the plurality of recognition patterns 410 and 420 or a distance (d2) between the sixth surface 106 of the body 100 and the plurality of recognition patterns 410 and 420 may be maintained in a constant distance.

It is intended that the present disclosure is not limited by the foregoing embodiments and the accompanying drawings, but rather by the claims appended hereto.

According to a coil component of exemplary embodiments of the present disclosure, a direction to be mounted on a printed circuit board and whether inclination is present, when mounted on the printed circuit board, may be recognized at the same time.

While embodiments have been illustrated and described above, it will be apparent to those skilled in the art that modifications and variations could be made without departing from the scope of the present disclosure as defined by the appended claims.

What is claimed is:

1. A coil component comprising:

a body including a first surface and a second surface opposing each other, a first side surface and a second side surface opposing each other and connecting the first surface of the body to the second surface of the body, and a third side surface and a fourth side surface opposing each other and connecting the first surface of the body to the second surface of the body;

a support substrate embedded in the body and including a first surface and a second surface opposing each other;

a first coil portion and a second coil portion respectively disposed on the first surface of the support substrate and the second surface of the support substrate to oppose each other with respect to the support substrate;

a first external electrode and a second external electrode disposed on the body and respectively connected to the first coil portion and the second coil portion; and a recognition pattern disposed on the first surface of the body and being in contact with one of the first external electrode and the second external electrode, wherein the recognition pattern extends, from an edge region in which the first surface of the body is in contact with the first side surface of the body, toward an edge region in which the first surface of the body is in contact with the second side surface of the body, the recognition pattern is spaced apart from the third side surface and the fourth side surface, the first external electrode and the second external electrode are respectively disposed on the first side surface and the second side surface of the body, and respectively extend onto at least portions of the second surface of the body, and the recognition pattern protrudes upward more than one of the first external electrode and the second external electrode.

2. The coil component according to claim 1, wherein the recognition pattern extends to the edge region in which the first surface of the body is in contact with the second side surface of the body.

3. The coil component according to claim 1, wherein the recognition pattern has a straight linear shape.

4. The coil component according to claim 1, wherein the recognition pattern is made of an insulating material.

5. The coil component according to claim 1, wherein the recognition pattern protrudes from the first surface of the body.

6. The coil component according to claim 1, further comprising a first lead-out portion and a second lead-out portion, respectively connected to end portions of the first and second coil portions and respectively exposed through the first side surface of the body and the second side surface of the body.

7. The coil component according to claim 6, wherein the first external electrode and the second external electrode respectively cover the first and second lead-out portions.

8. The coil component according to claim 1, wherein the first external electrode and the second external electrode do not cover the first surface of the body.

9. The coil component according to claim 1, wherein a distance between the recognition pattern and one of the third side surface and the fourth side surface of the body is less than a distance between the recognition pattern and another of the third side surface and the fourth side surface of the body.

10. A component comprising:

a body including a first surface and a second surface opposing each other, a first side surface and a second side surface opposing each other and connecting the first surface of the body to the second surface of the body, and a third side surface and a fourth side surface opposing each other and connecting the first surface of the body to the second surface of the body;

a support substrate embedded in the body and including a first surface and a second surface opposing each other;

a first coil portion and a second coil portion respectively disposed on the first surface of the support substrate and the second surface of the support substrate to oppose each other with respect to the support substrate; and a recognition pattern disposed on the first surface of the body, wherein the recognition pattern extends, from an edge region in which the first surface of the body is in contact with the first side surface of the body, toward an edge region in which the first surface of the body is in contact with the second side surface of the body, the recognition pattern is spaced apart from the third side surface and the fourth side surface, and the recognition pattern has a length of 1.0 mm or more and 1.6 mm or less in a length direction of the body in which the first and second side surfaces of the body oppose to each other.

11. A coil component comprising:

a body including a first surface and a second surface opposing each other, a third surface and a fourth surface opposing each other and connecting the first surface to the second surface, and a fifth surface and a sixth surface opposing each other and connecting the first surface to the second surface;

a support substrate embedded in the body and including a first surface and a second surface opposing each other;

a first coil portion and a second coil portion, respectively disposed on the first surface of the support substrate and the second surface of the support substrate to oppose each other;

a first external electrode and a second external electrode disposed on the body and respectively connected to the first coil portion and the second coil portion; and a plurality of recognition patterns disposed on the first surface of the body and spaced apart from one another, wherein at least one recognition pattern, among the plurality of recognition patterns, is in contact with one of the first external electrode and the second external electrode and extends from an edge region in which the first surface of the body is in contact with the third surface of the body, toward an edge region in which the first surface of the body is in contact with the fourth surface of the body, the plurality of recognition patterns are spaced apart from the fifth surface and the sixth surface of the body, the first external electrode and the second external electrode are respectively disposed on the third surface and the fourth surface of the body, and respectively extend onto at least portions of the second surface of the body, and the plurality of recognition patterns protrude upward more than one of the first external electrode and the second external electrode.

12. The coil component according to claim 11, wherein each of the plurality of recognition patterns has a straight linear shape.

13. The coil component according to claim 11, wherein the plurality of recognition patterns are made of an insulating material.

14. The coil component according to claim 11, wherein the plurality of recognition patterns protrude from the first surface of the body.

15. The coil component according to claim 11, further comprising a first lead-out portion and a second lead-out portion, respectively connected to end portions of the first and second coil portions and respectively exposed through the third surface of the body and the fourth surface of the body.

16. The coil component according to claim 15, wherein the first external electrode and the second external electrode respectively cover the first and second lead-out portions.

17. The coil component according to claim 11, wherein the first external electrode and the second external electrode do not cover the first surface of the body.

18. The coil component according to claim 11, wherein a distance between the plurality of recognition patterns and one of the fifth surface and the sixth surface of the body is less than a distance between the plurality of recognition patterns and another of the fifth surface and the sixth surface of the body.

19. A coil component comprising:

a body comprising a magnetic material and including a first surface and a second surface opposing each other, a first side surface and a second side surface opposing each other and connecting the first surface of the body to the second surface of the body, and a third side surface and a fourth side surface opposing each other and connecting the first surface of the body to the second surface of the body;

a support substrate embedded in the body and including a first surface and a second surface opposing each other;

a first coil portion and a second coil portion respectively disposed on the first surface of the support substrate and the second surface of the support substrate to oppose each other with respect to the support substrate;

a first external electrode and a second external electrode disposed on the body and respectively connected to the first coil portion and the second coil portion; and a recognition pattern directly disposed on the first surface of the body, wherein the recognition pattern extends in a direction substantially perpendicular to a first edge from the first edge, defined by the first surface and the first side surface of the body, toward a second edge in opposite to the first edge on the first surface, an entirety of the recognition pattern is spaced apart from the second edge, and the first external electrode and the second external electrode are respectively disposed on the first side surface and the second side surface of the body, and respectively extend onto at least portions of the second surface of the body, and the recognition pattern protrudes upward more than one of the first external electrode and the second external electrode.

20. The coil component according to claim 19, wherein the recognition pattern extends in a direction substantially parallel to a side edge of the first surface connecting the first edge to the second edge.

21. The coil component according to claim 19, wherein the first external electrode and the second external electrode do not cover the first surface of the body.

22. The coil component according to claim 19, wherein a distance between the recognition pattern and one of the third side surface and the fourth side surface of the body is less than a distance between the recognition pattern and another of the third side surface and the fourth side surface of the body.

* * * * *